US011477382B2

(12) United States Patent
Stec

(10) Patent No.: US 11,477,382 B2
(45) Date of Patent: Oct. 18, 2022

(54) METHOD OF STABILIZING A SEQUENCE OF IMAGES

(71) Applicant: FotoNation Limited, Galway (IE)

(72) Inventor: Piotr Stec, Galway (IE)

(73) Assignee: FotoNation Limited

( * ) Notice: Subject to any disclaimer, the term of this patent is extended or adjusted under 35 U.S.C. 154(b) by 912 days.

(21) Appl. No.: 15/999,767

(22) PCT Filed: Jan. 10, 2017

(86) PCT No.: PCT/EP2017/050390
§ 371 (c)(1),
(2) Date: Aug. 20, 2018

(87) PCT Pub. No.: WO2017/140438
PCT Pub. Date: Aug. 24, 2017

(65) Prior Publication Data
US 2021/0218894 A1    Jul. 15, 2021

Related U.S. Application Data

(60) Provisional application No. 62/359,582, filed on Jul. 7, 2016, provisional application No. 62/385,152, filed on Sep. 8, 2016.

(51) Int. Cl.
*G06K 9/40* (2006.01)
*H04N 5/232* (2006.01)
(Continued)

(52) U.S. Cl.
CPC ......... *H04N 5/23287* (2013.01); *G06T 5/006* (2013.01); *G06T 5/50* (2013.01); *H04N 5/23229* (2013.01); *H04N 5/23258* (2013.01)

(58) Field of Classification Search
CPC ...... G02B 2027/0138; G02B 2027/014; G06T 1/0007; G06T 7/251; G06T 7/579;
(Continued)

(56) References Cited

U.S. PATENT DOCUMENTS 5,649,237 A     7/1997  Okazaki
7,747,105 B2 *  6/2010  Koch .................. G06T 3/60
                                                         382/284
(Continued)

FOREIGN PATENT DOCUMENTS

CN    104982027 A    10/2015
CN    105208247 A    12/2015
(Continued)

OTHER PUBLICATIONS

State Intellectual Property Office of People's Republic of China, "The First Office Action" of CN Application No. 201780011421.6, filed Jan. 10, 2017, published as CN Pub. No. 108702450 on Oct. 23, 2018; Office Action dated Mar. 26, 2020, 7 pages.
(Continued)

*Primary Examiner* — Guillermo M Rivera-Martinez
(74) *Attorney, Agent, or Firm* — KPPB LLP

(57) ABSTRACT

A method operable within an image capture device for stabilizing a sequence of images captured by the image capture device is disclosed. The method comprises, using lens based sensors indicating image capture device movement during image acquisition, performing optical image stabilization (OIS) during acquisition of each image of the sequence of images to provide a sequence of OIS corrected images. Movement of the device for each frame during which each OIS corrected image is captured is determined using inertial measurement sensors. At least an estimate of OIS control performed during acquisition of an image is obtained. The estimate is removed from the intra-frame movement determined for the frame during which the OIS corrected image was captured to provide a residual measurement of movement for the frame. Electronic image stabilization (EIS) of each OIS corrected image based on the
(Continued)

residual measurement is performed to provide a stabilized sequence of images.

4 Claims, 6 Drawing Sheets

(51) Int. Cl.
*G06T 5/00* (2006.01)
*G06T 5/50* (2006.01)

(58) Field of Classification Search
CPC ... G06T 7/75; G06T 2207/10016; G06T 7/70; G06T 7/00; G06T 7/55; G06V 10/24
See application file for complete search history.

(56) References Cited

U.S. PATENT DOCUMENTS

| | | | |
|---|---|---|---|
| 8,493,454 | B1 | 7/2013 | Kohn et al. |
| 8,903,654 | B2 * | 12/2014 | Covello ............. H04N 5/23258 701/509 |
| 9,232,138 | B1 | 1/2016 | Baldwin |
| 9,743,001 | B1 | 8/2017 | Stec |
| 9,888,179 | B1 * | 2/2018 | Liang ................. H04N 5/23264 |
| 2006/0140503 | A1 | 6/2006 | Kurata et al. |
| 2008/0166115 | A1 | 7/2008 | Sachs et al. |
| 2013/0135315 | A1 * | 5/2013 | Bares .................... G11B 27/031 345/473 |
| 2013/0194418 | A1 | 8/2013 | Gonzalez-Banos et al. |
| 2014/0049658 | A1 | 2/2014 | Yamazaki |
| 2014/0160309 | A1 * | 6/2014 | Karpenko ............ H04N 5/2329 348/208.6 |
| 2014/0362256 | A1 | 12/2014 | Schulze et al. |
| 2015/0077434 | A1 * | 3/2015 | Fukuchi ................ G06T 19/006 345/633 |
| 2015/0262344 | A1 | 9/2015 | Stec et al. |
| 2016/0005164 | A1 * | 1/2016 | Roumeliotis .......... G01C 21/16 901/1 |
| 2016/0035104 | A1 * | 2/2016 | Bigioi ................ H04N 5/23254 348/208.1 |
| 2016/0360111 | A1 | 12/2016 | Thivent et al. |
| 2017/0243330 | A1 | 8/2017 | Stec et al. |
| 2017/0244881 | A1 | 8/2017 | Stec |
| 2017/0332018 | A1 * | 11/2017 | Bell .................... H04N 5/23267 |
| 2019/0007687 | A1 * | 1/2019 | Li ......................... H04N 19/547 |

FOREIGN PATENT DOCUMENTS

| | | |
|---|---|---|
| CN | 105118055 B | 12/2017 |
| GB | 2481098 A | 12/2011 |
| WO | 2014005783 A1 | 1/2014 |
| WO | 2014146983 A2 | 9/2014 |
| WO | 2016000874 A1 | 1/2016 |
| WO | 2016009199 A2 | 1/2016 |
| WO | 2017140438 A1 | 8/2017 |

OTHER PUBLICATIONS

Lepetitv et al: "Monocular Model-Based 3D Tracking of Rigid Objects: A Survey" Foundations and Trends in Computer Graphics and VI, Now Publishers, Inc, US, vol. 1, No. 1, Jan. 1, 2005 (Jan. 1, 2005), pp. 1-89, XP007903009, ISSN: 1572-2740 p. 5-p. 15, p. 18-p. 19, p. 78.
Alexandre Karpenko, et al: "Digital Video Stabilization and Rolling Shutter Correction using Gyroscopes" Mar. 1, 2011 (Mar. 1, 2011), XP055210192, Retrieved from the Internet: URL:https://graphics.stanford.edu/papers/stabilization/karpenko gyro.pdf [retrieved on Aug. 28, 2015], p. 1-p. 4.
EP International Searching Authority: International Search Report and Written Opinion for PCT Application No. PCT/EP2017/050390 Filed Jun. 20, 2017; Report completed Jun. 8, 2017 and dated Jun. 20, 2017.
International Preliminary Report on Patentability for International Application PCT/EP2017/050390, Report issued Aug. 21, 2018, dated Aug. 30, 2018, 13 Pgs.
International Search Report and Written Opinion for International Application No. PCT/EP2014/055125, Search completed Jun. 30, 2014, dated Sep. 23, 2014, 17 Pgs.
U.S. Appl. No. 15/048,224 by Piotr Stec filed Feb. 19, 2016, 10 pages.

* cited by examiner

METHOD OF STABILIZING A SEQUENCE OF IMAGES

FIELD

The present invention relates to a method of stabilizing a sequence of images.

BACKGROUND

Optical Image Stabilization (OIS) is a mechanism used in a still camera or video camera that stabilizes the recording of an individual image by varying the optical path to the sensor during image acquisition. This technology can be implemented within a lens or by moving the sensor as the final element in the optical path. The key element of all optical image stabilization systems is that they stabilize the image projected on the sensor before the sensor converts the corrected image into digital information.

Referring to FIG. 1, for example, Nikon and Canon's implementations of OIS work by using a floating lens element that is moved orthogonally to the optical axis of the lens using electromagnets, by a lens shift distance. Vibration is detected using two piezoelectric angular velocity sensors (often called gyroscopic sensors), not shown, one to detect horizontal movement and the other to detect vertical movement. When a camera is rotated as shown in FIG. 1, OIS compensates for the object motion caused by the camera rotation by shifting the lens barrel in order to maintain object position on the sensor. This type of compensation has its limitations: the optical image stabilizer corrects only for pitch and/or yaw axis rotations, and does not correct for rotation along the optical axis and as such, changes in perspective projection, caused by the camera rotation, are not compensated or perspective distortion can result from the correction applied; also the range of the correction provided by OIS is usually limited. Thus, as illustrated in the example of FIG. 2(a) where if a camera moves significantly during image acquisition, only a portion of this movement will be compensated leaving a distorted OIS corrected image. Note that the form of distorted image shown is caused by varying yaw movement during capture of an image using a rolling shutter.

Application of OIS is still popular due to fact that it can actively reduce the amount of motion blur in the final image due to fact that lens is following the motion of the image during image exposure time, keeping the center of the frame steady (within limits) on the sensor surface.

Electronic Image Stabilization (EIS) involves shifting images from frame to frame of video, enough to counteract inter-frame motion. EIS can be based only on frame-to-frame image analysis, using pixels outside the border of the visible frame to provide a buffer for motion. This technique reduces distracting vibrations within videos by smoothing the transition from one frame to another. This technique does not affect the noise level of the image, except in the extreme borders if the image is extrapolated. It cannot do anything about existing motion blur, which may result in an image seemingly losing focus as motion is compensated.

However, this approach has its own problems as it can become unreliable in certain situations (lack of details, large moving objects, and repetitive patterns).

Some forms of EIS are supplemented with measurements of camera motion provided by camera inertial sensors (IMU). In that case, knowing the camera intrinsic properties, the motion in the sensor plane can be recreated and filtered in order to provide a stable video sequence, albeit with potentially camera motion blurred images.

Note that OIS and EIS stabilizations, especially those based on IMU external to the lens, are not used together. This is because OIS introduces image motion that no longer correlates with the camera motion. For example, let us assume that OIS is correcting 20% of camera shake. An IMU-based EIS stabilization would have no information about this correction and would attempt to compensate for 100% of the camera shake. This results in overcorrection that is visible in the resulting video as a residual camera shake. This shake is particularly visible as it does not follow natural motion patterns. This situation is illustrated by FIG. 2(b) which shows the correction applied according to camera trajectory on an image that was already partially corrected by OIS. Instead of straight objects, we get objects bent in the opposite direction.

Lepetit et al "Monocular Model-Based 3D Tracking of Rigid Objects: A Survey", Foundations and Trends in Computer Graphics and Vision, NOW PUBLISHERS INC, US, vol. 1, no. 1, 1 Jan. 2005, pages 1-89, ISSN: 1572-2740 discloses using quaternions to estimate camera pose for a given camera rotation in 3D space.

SUMMARY

According to the present invention there is provided a camera module according to claim 1.

According to a further aspect, there is provided an image capture device according to claim 7.

In a still further aspect, there is provided a camera module according to claim 8.

Embodiments of the present invention combine inertial Electronic Image Stabilization (EIS) with Optical Image Stabilization (OIS) to provide improved image quality within a video sequence.

In a still further aspect, there is provided a camera module according to claim 10.

BRIEF DESCRIPTION OF THE DRAWINGS

Embodiments of the invention will now be described, by way of example, with reference to the accompanying drawings, in which.

DESCRIPTION OF THE EMBODIMENTS

Figure 1:
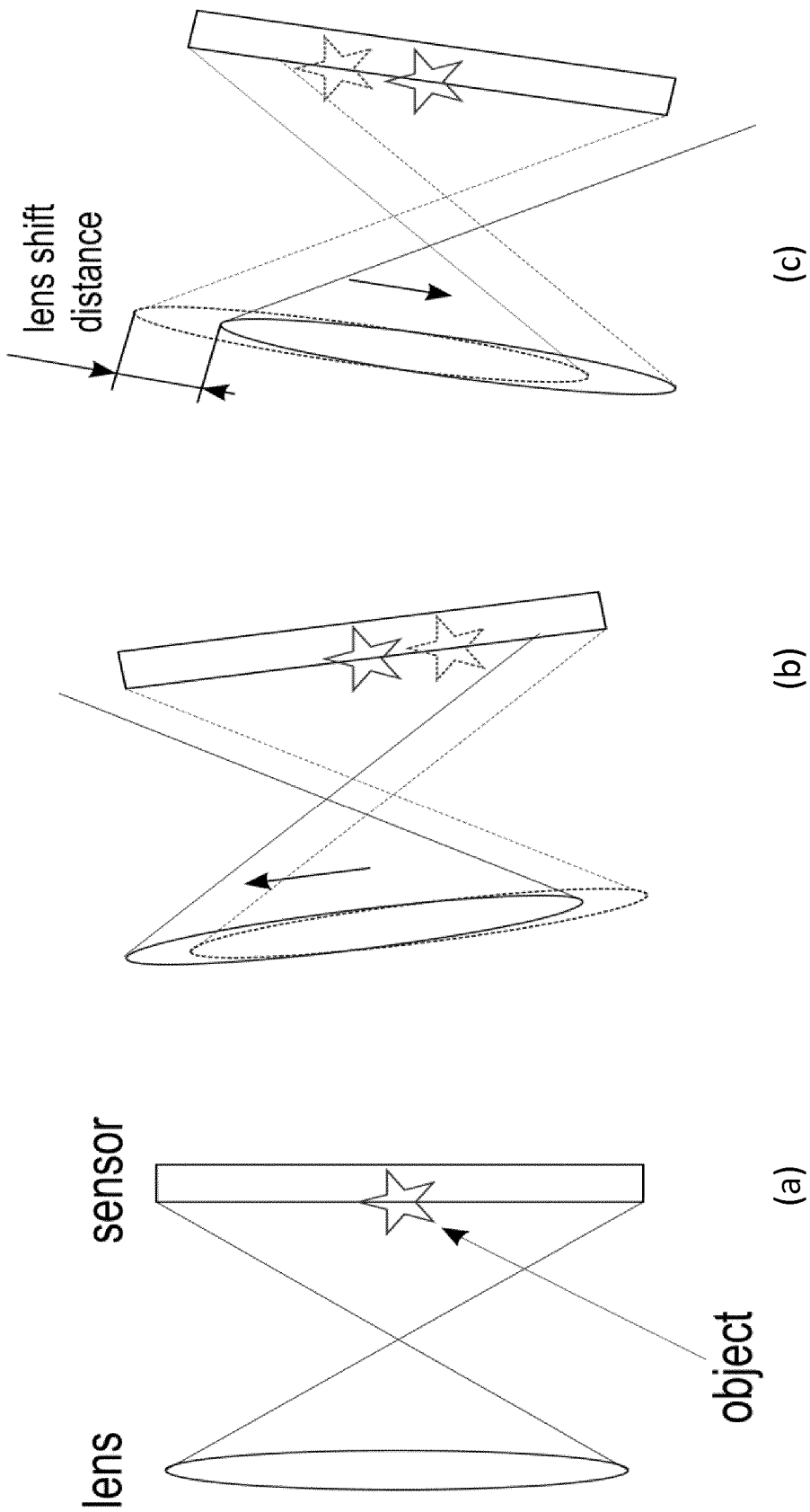
FIG. 1 illustrates camera movement and OIS lens compensation movement employed with a conventional OIS controller.
Figure 2:
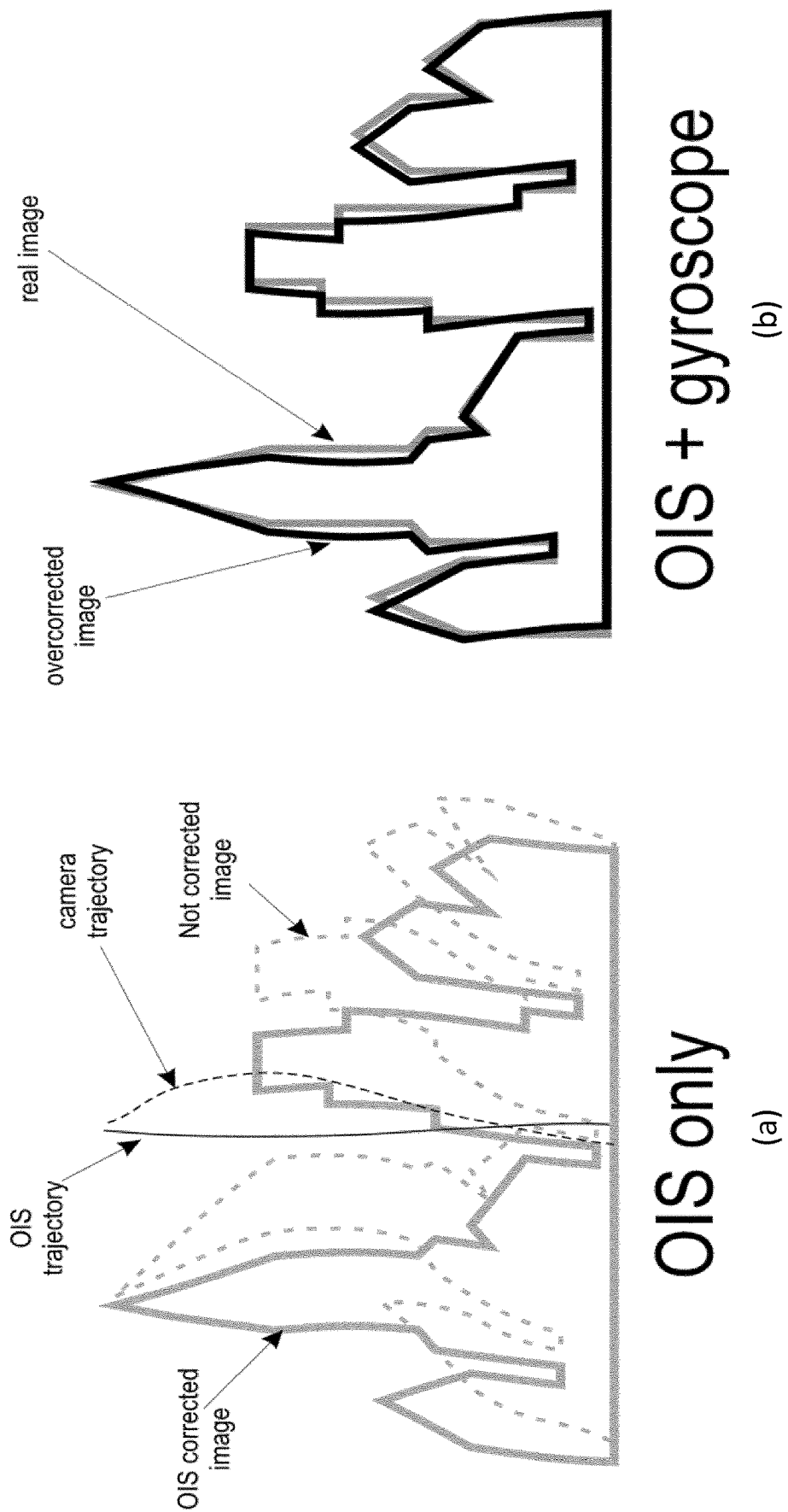
FIG. 2(a) shows correction with OIS leaving some motion and rolling shutter artefacts in an image.
FIG. 2(b) shows over-correction of an image when IMU based EIS is applied to an OIS corrected frame.
Figure 3:
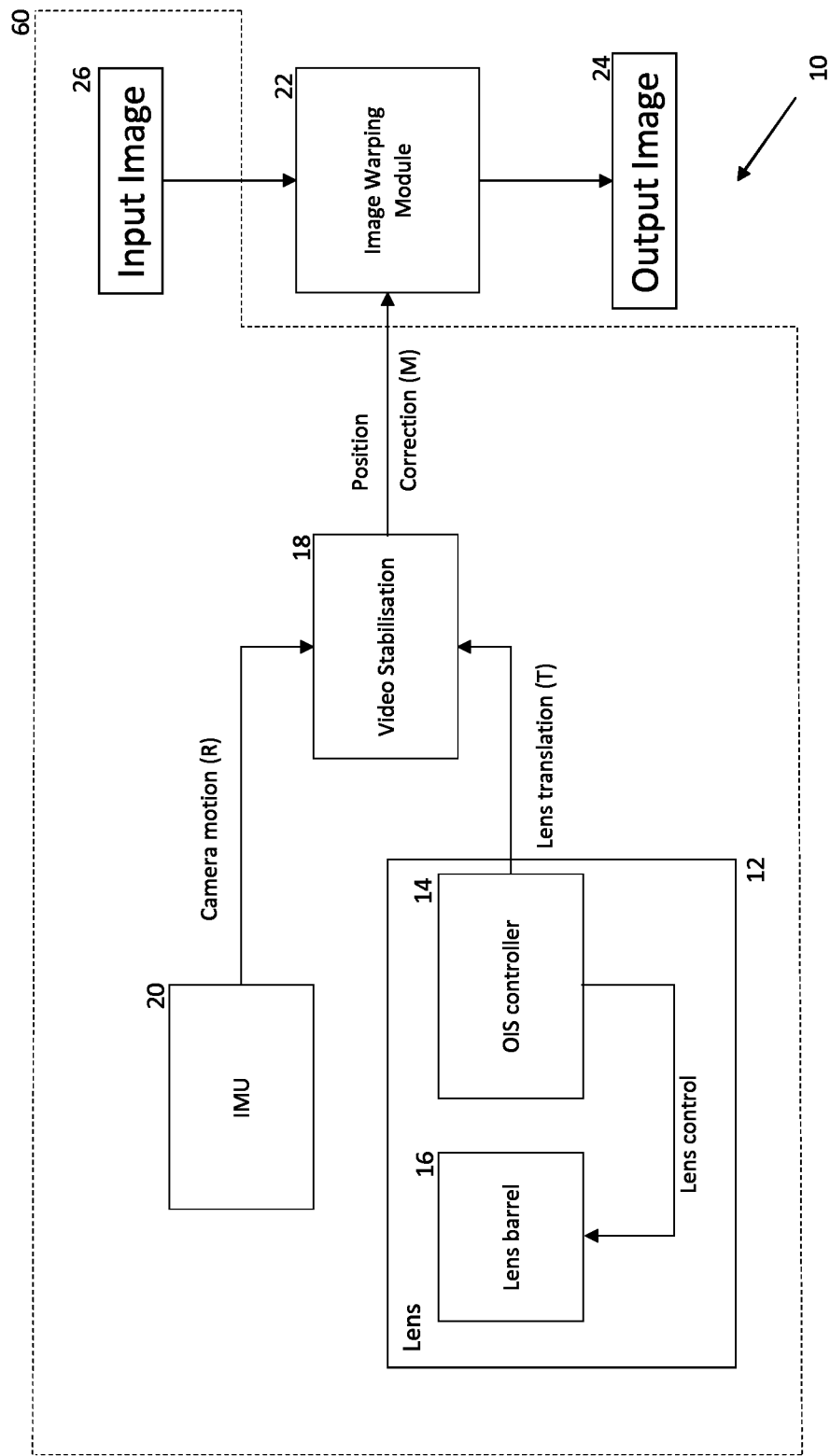
FIG. 3 illustrates an image acquisition device performing video stabilization using camera motion and lens position information according to a first embodiment of the present invention.

Referring to FIG. 3, which illustrates an image acquisition device 10 according to a first embodiment of the present invention. The device 10 includes a lens 12 including an OIS controller 14 arranged to perform OIS control by moving a lens barrel 16 during image acquisition in a conventional manner. (In alternative implementations, the OIS controller 14 could equally move the image sensor (not shown).) The OIS controller 14 reports the movement of the lens (lens shift distance from FIG. 1) to a video stabilization module. In the embodiment, it is assumed that an image is read from the image sensor using a rolling shutter technique with each row (or group of rows) of an image being read successively from the image sensor. Thus, the x and y movement of the lens during image acquisition varies from row to row of the image as well as possibly along the rows of the image. The resultant record of lens movement can therefore be thought of as a matrix T[ ], with each row indicating x, y movements at different moments in time during image acquisition. Note that the resolution of the matrix T[ ] does not have to correspond with the image resolution. Also, note that the x,y components vary across rows of the image, however, this may not be the case if pixels of a row are captured simultaneously i.e. the components of T[ ] along any given row may be the same and in such a case, the matrix T[ ] could be represented as a Ax1 matrix, where A is the number of rows of the matrix.

Referring back to FIG. 3, the device 10 also comprises a set of inertial sensors (IMU) 20 and these produce a matrix R[ ] indicating the x, y and z movement and orientation of the device during frame acquisition. The IMU sensors 20 can comprise any combination of gyroscopic sensors, accelerometers and/or magnetometers indicating device movement during image sequence capture. Note that the x, y as well as z movements recorded by the IMU sensors 20 will be at least as large as those required by the OIS controller whose lens/sensors movements during image acquisition are limited; and also because image exposure only occupies a portion of frame time. Also, note that the representation of changes in camera orientation during image acquisition ($R_X$ $R_Y$ $R_Z$) is not limited to an orientation matrix. Other representations as Euler angles, quaternions etc. can be used.

Note that it is important that the record of device movement R[ ] captured by the IMU sensors 20 be capable of being synchronized with the lens movement T[ ] recorded by the OIS controller 14. While it is not necessary that these be captured at the same spatio-temporal resolution, if the values are to be correlated accurately with one another, they need to be performed on the same time basis. Thus in some embodiments, the matrix T[ ] provided by the OIS controller is time stamped using the same timer used to generate timestamps for the IMU matrix R[ ]; or at least the timestamp sources are calibrated so that the matrices R[ ] and T [ ] can be correlated with one another. In other embodiments, a common clock signal could be employed by each of the OIS controller 14 and the IMU sensors 20, but it will be appreciated that any synchronization technique can be used.

In any case, each of the movement matrices T[ ] and R [ ] are fed to a video stabilization module 18. In one embodiment, the video stabilization module 18 uses the matrix R[ ] to calculate the amount of correction (local displacement in the sensor plane) required for video stabilization based on the camera orientation change with respect to orientation in the previous frame.

The video stabilization module 18 then subtracts the lens barrel shift amount indicated by the matrix T[ ] to provide a final correction matrix M[ ]. This is done to remove the correction already applied by the OIS controller 14, as not subtracting it from the correction calculated using IMU data will lead to overcorrection.

The video stabilization module 18 provides the final correction matrix M[ ] to an image warping module 22 in order to produce a stabilized output frame 24 based on the OIS corrected input image 26 corresponding to the matrix T[ ].

More formally, knowing the camera intrinsic matrix K:

$$K = \begin{pmatrix} f & s & x_0 \\ 0 & f & y_0 \\ 0 & 0 & 1 \end{pmatrix}$$

where f=focal length; $x_0$, $y_0$ are the principal point offsets; and s=axis skew, the final correcting transformation matrix M can be defined as follows:

$$M = KRK^{-1}T^{-1}$$

where R[ ] and $T^{-1}$[ ] have been normalized to correspond with one another.

Thus after inverting the correction T applied by the OIS controller 14, EIS based on a final correction (M) applied by the image warping module 22 can be performed without introducing distortion into the resultant output image 24.

Unlike the OIS controller 14 of the first embodiment, when an OIS controller does not provide information about lens position, a precise combination of OIS and IMU sensor based EIS stabilization is not possible.

Figure 5:
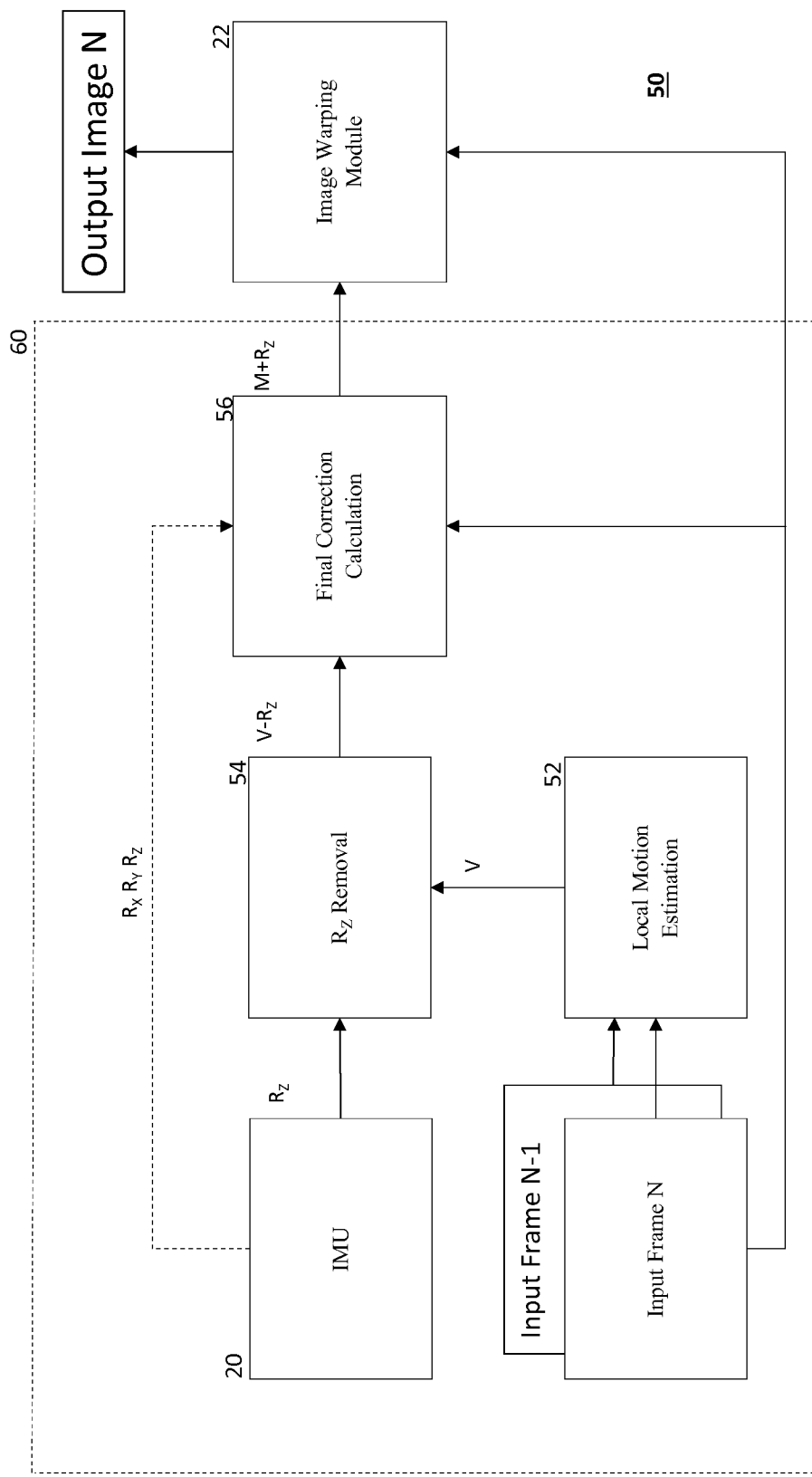
FIG. 5 illustrates an image acquisition device performing video stabilization with unknown OIS according to a second embodiment of the present invention.

Referring now to FIG. 5, in a second embodiment, an image acquisition device 50 recovers as much reliable information about camera movement during frame acquisition from its inertial sensors (IMU) 20 as possible and treats OIS stabilization being performed within a lens as a black box with unknown parameters. (Thus, the OIS controller is not shown in FIG. 5.)

The embodiment of FIG. 5 is based on the assumption that the OIS controller does not correct for rotations around the optical axis although it will be appreciated that variations of this embodiment could be readily adapted to operate with OIS controllers that did attempt to correct for such rotations. The embodiment of FIG. 5 is again based on the assumption that OIS correction is limited and that the extent of x, y (and possibly z) correction for movement of the camera is less than that recorded by the device IMU sensors 20.

As before, each input image frame . . . N−1, N . . . captured by the image sensor is already stabilized using OIS, but the level of stabilization is unknown. Note that because the OIS controller typically only uses inertial sensors, it is unaffected by the motion of objects that could be in the camera's field of view.

Nonetheless, a displacement map V[ ] (FIG. 4) estimating the frame to frame motion between any given input frame N and a preceding (or succeeding) frame N−1 can be determined, for example, as disclosed in WO2014146983 (Ref: FN-389) the teaching of which is incorporated herein by reference. This map can take a similar form to the displacement matrix T[ ] provided by the OIS controller 14 in the first embodiment, except that it represents the overall frame to frame motion for an image less the OIS correction performed by the controller within the image acquired during the frame.

Thus, this embodiment is based on knowing the overall frame to frame motion R[ ] from the IMU sensors 20 and combining this information with the displacement map V[ ] to extract an estimate of OIS correction applied across the image so that this can be removed before an image warping module 22, similar to that of FIG. 3, corrects the input image frame.

Again, the camera IMU sensors 20 provide information about actual camera rotation along all three axes ($R_X R_Y R_Z$) during frame acquisition. Where the OIS controller does not correct for rotation around optical axis (typically Z axis), correction for movement around this axis can be applied in full, by the image warping module 22, based on the gyroscope input.

Thus, before a position correction matrix is calculated, the $R_Z$ components of movement across an image can be removed from the displacement map V[ ] produced by the local motion estimation unit 52 by an $R_Z$ Removal block 54. After this, the motion field V-Rz[ ] will contain only motion in X,Y directions partially corrected by the OIS controller and containing outliers caused by the moving objects and estimation errors.

A final correction calculation module 56 calculates a residual correction matrix M[ ] using image analysis supported by the IMU sensor output $R_X R_Y R_Z$ by. In this case, $R_X R_Y R_Z$ are not applied directly to V-Rz[ ], but help in verification of the local motion vectors retrieved by the image analysis performed by the block 56 to extract the OIS controller motion component T[ ] from the V-Rz[ ] matrix. So for example, the final correction calculation block 56 can use IMU sensor output R[ ] to filter out any outlier vectors from the motion field V-Rz[ ]. The remaining vectors can then be used to calculate the transformation matrix T[ ].

Once this matrix T[ ] has been generated, the residual correction matrix M[ ] can be generated as in the first embodiment to indicate the X,Y stabilization that needs to be performed across the image by an image warping module 22.

Because the rotation of the camera $R_Z$ was previously subtracted from the motion field, the final correction calculation block 56 adds this back to form the final transformation between two consecutive frames. This matrix M+Rz[ ] can be further filtered if required.

Figure 4:
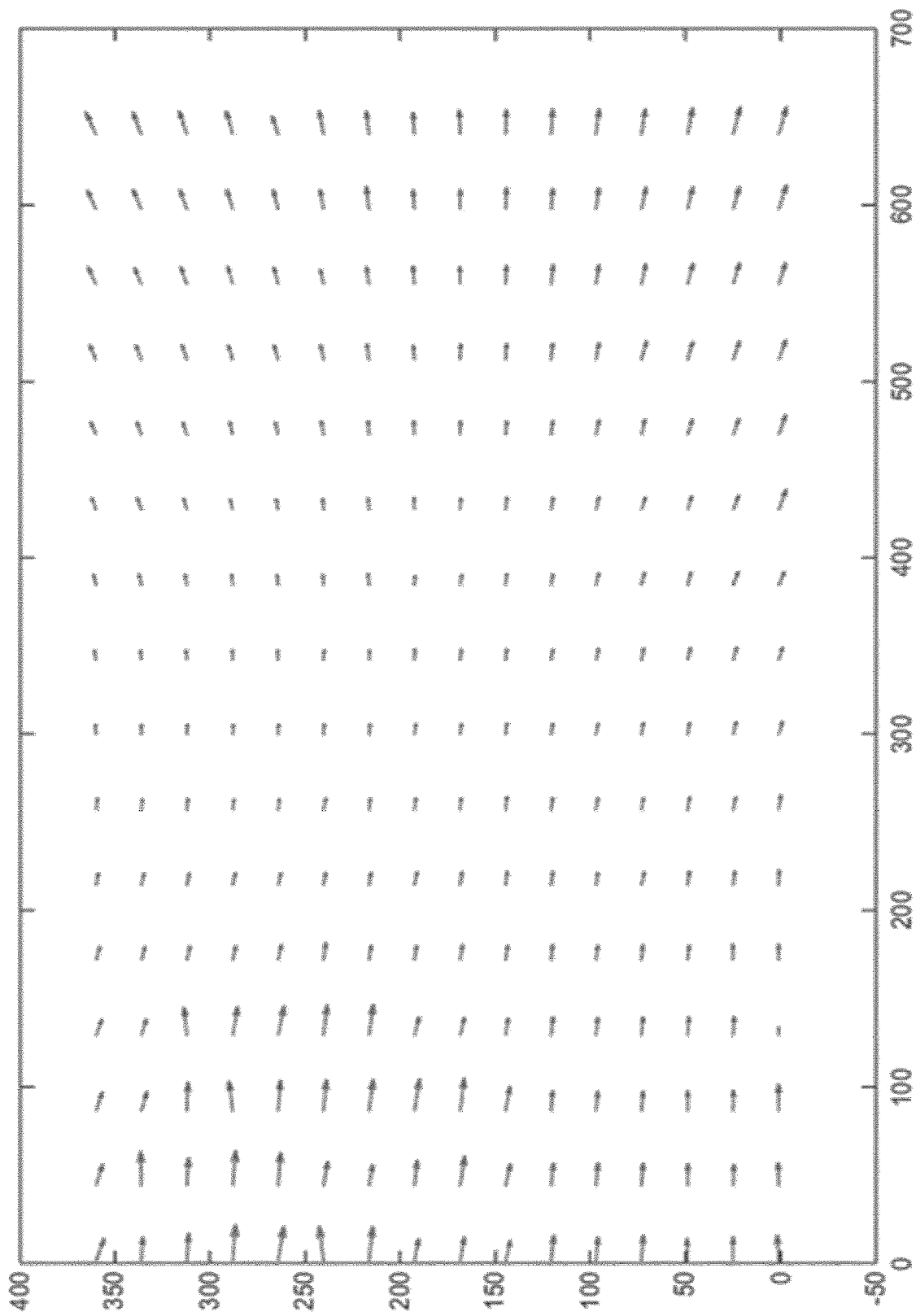
FIG. 4 shows exemplary motion vectors measured between two consecutive images.

In summary, using the second embodiment, a motion field VI similar in form to that shown in FIG. 4 can be generated from a series of images that were stabilized using OIS. This stabilization is equivalent to shifting the image in the sensor plane in X, Y directions by unknown values by vector field T. At the same time using $R_X$ and $R_Y$ from IMU sensors 20 and knowing the camera intrinsic matrix K, we can recreate a reference X,Y motion field $V_R$. Each component of $V_R$ should be greater than the corresponding component of $V_I$ as the magnitude of $V_I$ components is reduced by the degree of OIS control and $V_I$ components are only generated during a portion of frame time.

Assuming a perfect motion field $V_I$ (no outliers or errors) the shift introduced by the OIS will be:

$$T = V_R - V_I$$

In the real situation, the $V_I$ field will contain outliers and as a result, vector field T will contain outliers. However, since the vector field T is a result of motion strictly in the image plane, all we need to find is the translation matrix with two independent parameters X,Y. By comparison, estimation of a homography matrix would require finding 8 or 9 independent parameters and is not only more complex but is also more prone to numerical conditioning and overfitting.

Assuming we are dealing with a rolling shutter camera, we need to find the translation value for each of the rows of vectors and interpolate intermediate values if needed. This will give the estimated trajectory T[ ] applied by the OIS controller.

The next step will be calculation of the correction values M[ ] using camera rotations obtained from IMU and lens projection parameters. From this correction we need to subtract the motion already corrected by the OIS (based on T motion field) to get the final correction.

Using the above embodiments, all calculations can be performed at any point in time allowing for the recovery of the camera trajectory T[ ] during the exposure time of the frame and as a consequence perform effective rolling shutter effect removal.

Incorporating the information from the IMU sensors 20 reduces the number of degrees of freedom during calculation of the residual correction matrix M[ ]. This helps in removing outliers from the original motion field and increases the reliability of estimated correction matrix.

In variants of the above described embodiments, measurements $R_X R_Y R_Z$ from the camera IMU 20, especially gyroscope signals, can be integrated as a function of the exposure time of the image frames as disclosed in co-filed U.S. patent application Ser. No. 15/048,224 entitled "A method for correcting an acquired image" (Reference: FN-483-US), to mitigate distortion caused by high frequency vibration of the camera. These signals with appropriate conditioning may substitute for, either in part or in whole, or be combined with raw $R_X R_Y R_Z$ measurements in performing EIS as described above.

The above described embodiments have been described in terms modules 18, in FIG. 3, and modules 52, 54 and 56, in FIG. 5, being implemented as downstream processing modules which respond to input frames being supplied by a camera module to determine a correction matrix M[ ] which is used to correct for frame to frame image distortion. However, it will be appreciated that instead of employing a separate lens (not shown) and camera IMU 20, a single IMU 20 incorporated within a camera module 60 could be used both for OIS and to enable the camera module 60 to provide the remainder of an image acquisition device with a correction grid associated with each acquired image frame to allow each frame to be corrected to provide, for example, EIS, in a manner similar to the manner in which the geometrical distortion core (GDC) disclosed in WO2014/005783 (Ref: FN-384) employs a distortion (correction) grid to correct a distorted image.

It will be appreciated that once such functionality has been incorporated within a camera module 60, the functionality of the camera module may be further extended to control the correction grid and to accommodate distortion effects other than EIS as described below in more detail in relation to FIG. 6.

Figure 6:
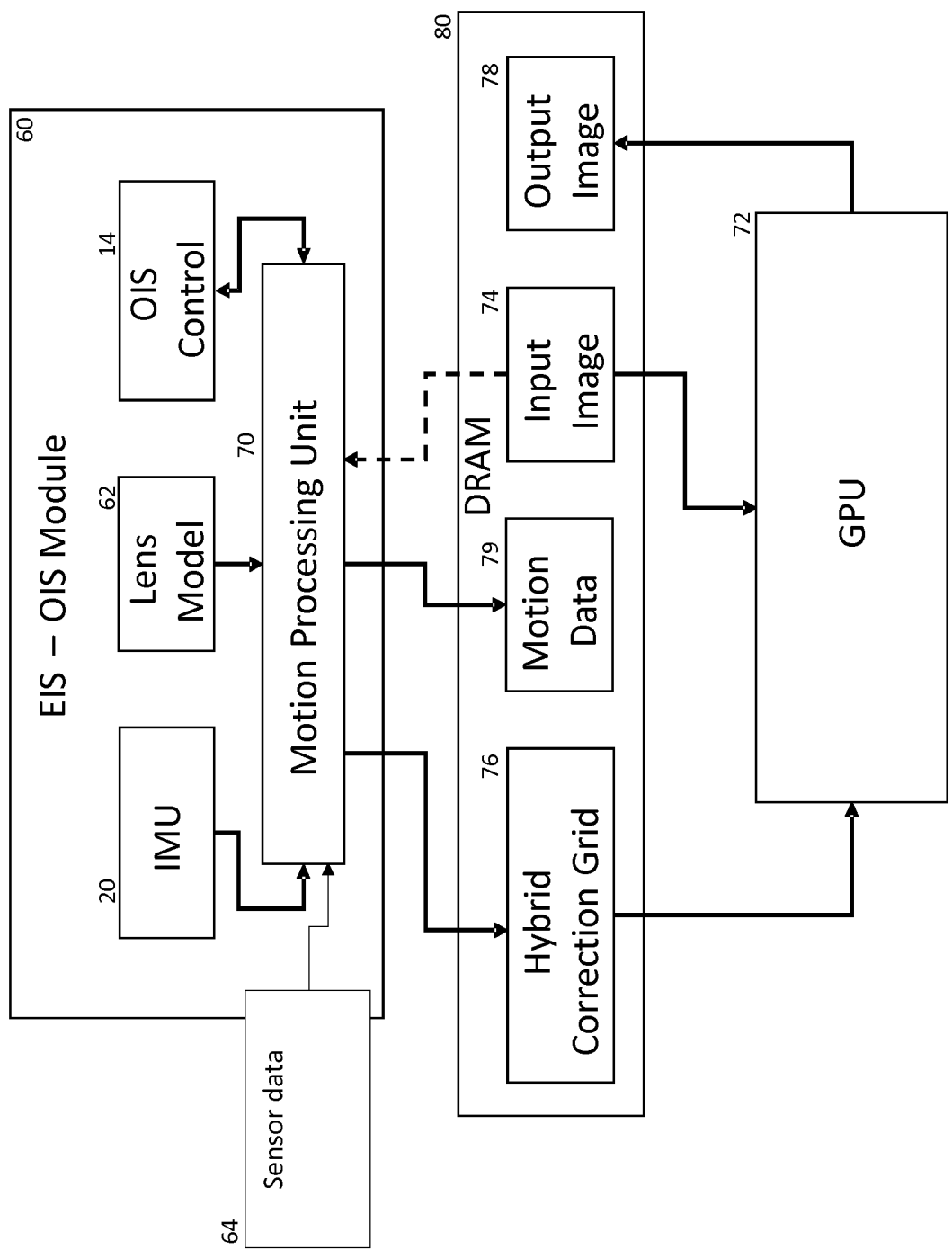
FIG. 6 is a schematic diagram of an image capture device including a camera module according to an embodiment of the present invention.

In FIG. 6, such a camera module 60 comprises a motion processing unit 70 which implements the functionality described above in relation to modules 18 and 52-56 respectively.

Note that the output of the correction calculation modules 18 and 56 of the embodiments of FIGS. 3 and 5 can comprise a correction matrix M[ ] derived from a motion map such as shown in FIG. 4. However, it can be useful for the motion processing unit 70 to transform this motion map into a correction grid such as that provided by the grid formatter disclosed in WO2014/005783 (Ref: FN-384).

Thus, in the embodiment of FIG. 6, the motion processing unit of the camera module 60 calculates a correction grid, such as disclosed in WO2014/005783 (Ref: FN-384), using a motion field (FIG. 4), the IMU 20 output and information from the OIS controller, if provided.

The motion processing unit 70 writes acquired input images 74 along with respective associated correction grids 76 into system memory 80 so that a processing unit, in this case a dedicated graphics processing unit (GPU) 72, can correct each input image and write a corrected output image 78 back to system memory 80. As in WO2014/005783 (Ref: FN-384), the correction grid 76 provided for each image, in this case referred to as a hybrid correction grid, can take into account global transformation characteristics, local transformation characteristics or even affine transformation characteristics, for example, to compensate for rolling shutter distortion.

As well as providing acquired images and their associated correction grids, the camera module 60 writes motion data 79 to system memory 80 so that this case be used by other applications or modules running in the device so avoiding the need for a second IMU within the device.

In addition to this functionality, the camera module 60 also incorporates a lens projection model 62 in order to enable the motion processing unit 70 to properly predict the behavior of an image projected by the camera lens 12 and acquired by the camera imaging sensor.

Using this lens model 62, the motion processing unit 70 can control the correction grid provided for each image frame to take into account the characteristics of the image acquisition system, the lens model 62, as well as IMU input 20 and, if activated, OIS control 14.

Typically, lens projection can be represented as a 3D grid that is used to transform an image in order to apply correction to artefacts caused by camera movement and rolling shutter for example as disclosed in WO2014/005783 (Ref: FN-384).

As mentioned above, in some embodiments, the changes in camera orientation during image acquisition ($R_X$ $R_Y$ $R_Z$) can be represented using quaternions. In this case, rather than converting the quaternion to a rotation matrix in order to transform a correction grid node, represented as a vector in a Cartesian coordinate system, by multiplication (which poses much greater computational cost than multiplication of two quaternions), correction grid nodes determined based on the lens projection can be represented as quaternions and transformed as such. This can be done due to fact that the projection of a camera can be represented as mapping of the intersections of the incoming light rays with a unit sphere to the locations on the surface of the projection plane.

Obtaining the quaternion Q=(w, i, j, k) by rotating a vector A=(0, 0, 1) representing the optical axis to P=(X, Y, Z) can be performed as follows:
1. d=dot(A,P)/vector dot product
2. ax=cross(A,P)/vector cross product
3. w=sqrt(norm(A)^2+norm(P)^2)+d/w component of the quaternion
4. Q=normalizeQuaternion([w, i=ax(0), j=ax(1), k=ax(2)])/final quaternion The projection of a point P in 3D space, corresponding to a node of the correction grid, onto a projection plane is performed in step 3 of the following algorithm after taking in account rotation of the camera. Thus calculation of the correction grid for an image comprises:
1. Back-projection from the image (sensor) space to 3D according to the lens projection model to provide quaternion representations Q for each node of a correction grid;
2. Rotation (to take into account rotation measured by a gyroscope or other means) of the quaternions Q. The rotation is calculated using input from a gyroscope within the IMU 20. This rotation is represented as a quaternion;
3. Projection back to the image space. Reference 3D points (or quaternions Q as calculated above) based on the lens projection model are rotated according to the camera motion quaternions and projected back to 2D space to form a correction grid, that can then be used by the GPU 72 to perform the correction.

In some implementations, step 3 could be performed using a conventional approach, where finding the projected coordinates p=(x,y) of the reference point P=(X, Y, Z) requires finding the distance of the point P to the projection axis:

$$R=\sqrt{X^2+Y^2}$$

calculating the angle of incidence:

$$\alpha=\operatorname{atan}(R,Z)$$

obtaining the projected radius $$r=f(\alpha)$$

and finally calculating the location of the point on the projection plane $$x = \frac{Xr}{R},$$
$$y = \frac{Yr}{R}$$

However, it will be seen that the square roots and atan( ) function required to do so would be processor intensive.

In embodiments based on quaternions, the w component cannot be used directly as an index to a lookup table representing conversion of w to the radius because of high nonlinearity of this function. Rather than using w directly as an index to a look-up table, step 3 of the above process works as follows:
1. Take a quaternion (w, i, j, k) representing point orientation P(X,Y,Z) in space;
2. Calculate $$d = \frac{1}{\sqrt{1-w^2}};$$

3. Use 1/d as an index to a lookup table to retrieve radius value r. The lookup table is pre-calculated using exact math for accuracy as follows: A given range of angle values is written into uniformly distributed array; the corresponding w values are calculated and the corresponding index values are written into another array (This creates angle->index mapping); and this relation is then reversed, for example, using spline interpolation to create index->angle relationship with uniformly distributed indices;
4. Calculate X,Y coordinates of the rotation vector from the quaternion components: X=id, Y=jd;
5. Calculate location of the projected point: x=Yr, y=Xr. Note this is not a mistake—rotation vector X, Y coordinates are swapped to achieve 90 degrees rotation.

Now, once the correction grid taking into account lens projection and changes in camera orientation during image acquisition ($R_X$ $R_Y$ $R_Z$) represented using quaternions has been determined as described above, the correction grid can be further adjusted to take into account OIS control during the acquisition of the image by for example, subtracting the translation T[ ] applied by the OIS controller 14 as measured by the IMU 20 from the correction grid during image acquisition.

An alternative way of calculating the lens projection can be used in a case of forward distortion mapping. In such case, the undistorted grid is associated with the senor image and pixel location on the output image is calculated. Since the regular grid is associated with the sensor, it can be assumed that pixels along a single row of grid nodes were captured at the same time and share the camera orientation. In such case, the correction rotation can be calculated once per row and applied to all the grid nodes belonging to that row. In such case it is more efficient to store the 3D reference grid as normal 3D vectors in Cartesian coordinates, calculate the rotation matrix from quaternion and multiply the vectors by the matrix. Matrix multiplication requires 9 scalar multiplications versus quaternion multiplication requiring 16 scalar multiplications. Such case can also benefit from the fact that all the 3D vectors forming reference grid lay on a unit sphere. The Z distance of the vector will be in functional relationship to the angle of incidence. Following a similar idea to the case of quaternions, the Z coordinate can be used for indexing a lookup table instead of the w component of the quaternion with similar computational cost. Thus, point 2 above will have the following form:

$$d = \frac{1}{\sqrt{1-Z}}$$

The lookup table will have to be built accordingly following similar steps to the quaternion approach (step 3). Step 4 will not be necessary as direction will be given explicitly by X and Y components of the vector. Since X, Y components do not form unit vector, the lookup table will need to contain pre-calculated values of r/R instead of r alone.

Using a system such as shown in FIG. 6, image stabilization can be achieved by means of Electronic Image Stabilization (EIS), Optical Image Stabilization (OIS) or combination of both. The module 70 can calculate both control signals for OIS and a correction grid for EIS. When OIS is active, the calculation of the correction grid will take into account correction introduced by OIS and correct only the remaining motion artefacts.

The correction grid 76 can be generated in two styles:

1. Forward mapping grid suitable for GPU-style correction where a content of the destination image is warped by the underlying warping grid as disclosed in WO2014/005783 (Ref: FN-384).

2. Where transformation is defined as a texture mapping grid that maps an output coordinate system to the source coordinate system.

Generation of each correction grid 76 by the motion processing unit 70 can also take into account auto-focusing (AF) activity to prevent or smooth changes in image scale during "focus hunting" process. In order to do so, the motion processing unit 70 acquires data from sensors 64 both internal and external to the camera module 60, for example, to track the DAC codes employed to drive the auto-focus mechanism as described in more detail in WO2016/000874 (Ref: FN-396) and this can be used to scale the correction grid to ensure that imaged objects, such as faces, maintain their scale within an image as focus is varied.

Providing a correction grid 76 as meta-data together with an input image 74 relieves downstream processors such as the GPU 72 from needing to perform motion analysis and synchronization between motion data and image data.

As will be appreciated, there may be some delay in the motion processing unit 70 calculating a correction grid 76 for any given acquired input image 74 and for this reason, motion data 79 provided by the camera module 60 can be internally buffered and the correction grid 76 generated with a pre-programmed delay. For example if the delay is 10 frames, the camera module 60 can buffer frames numbered 0 to 9 and together with frame 10, provide a correction grid for frame 0 to the remainder of the system then, with frame 11, provide a correction grid for frame 1 and so on. In this case the camera module 60 will have to buffer a pre-defined number of frames. However, this will also allow for better motion analysis and more optimal image stabilization.

The invention claimed is:

1. A camera module (60) for an image capture device comprising:
   inertial measurement sensors (20) arranged to indicate image capture device movement during image acquisition,
   a lens (12),
   an image sensor, and
   a camera module processor (70) arranged to:
   provide a measurement of movement for an image frame (74) in terms of rotation around each of said image capture device's X, Y and Z axes represented as quaternions;
   back-project a plurality of nodes from an image sensor space to a 3-dimensional space according to a projection model for said lens to provide quaternion representations Q for each node of a correction grid;
   rotate said quaternions Q according to said measurement of movement for an image frame;
   project said rotated quaternions back to the image sensor space to form the correction grid (76); and
   provide the correction grid for said frame and said frame to a central camera processor (72) for correction of said image frame (74) based on said measurement of movement and said projection model.

2. A camera module according to claim 1 wherein a quaternion (w,i,j,k) represents point orientation P(X, Y, Z) in space, wherein projecting each rotated quaternion Q=(w,i,j,k) comprises:
   calculating $$d = \frac{1}{\sqrt{1-w^2}};$$

using 1/d as an index to a lookup table to retrieve a radius value r;
   calculating X, Y coordinates of a rotation vector from the quaternion components as follows: X=id, Y=jd;
   calculating a location of the projected point on the correction grid as follows: x=Yr, y=Xr.

3. A camera module according to claim 2 wherein said look-up table is pre-calculated.

4. A camera module according to claim 1 wherein said camera module processor is further arranged to:
   selectively perform optical image stabilization (OIS) control (14) during capture of images in a sequence of images based on inertial measurement sensors' signals to obtain OIS corrected images from said image sensor, obtain at least an estimate of OIS control performed during acquisition of an image;

adjust the correction grid to remove said estimate from the intra-frame movement determined for the frame during which said OIS corrected image was captured.

* * * * *